US008793499B2

(12) United States Patent
Loughry

(10) Patent No.: US 8,793,499 B2
(45) Date of Patent: Jul. 29, 2014

(54) NESTED DIGITAL SIGNATURES WITH CONSTANT FILE SIZE

(75) Inventor: Robert Joseph Loughry, Centennial, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 61 days.

(21) Appl. No.: 13/355,210

(22) Filed: Jan. 20, 2012

(65) Prior Publication Data
US 2013/0191642 A1 Jul. 25, 2013

(51) Int. Cl.
*G06F 21/64* (2013.01)
*G06F 21/33* (2013.01)

(52) U.S. Cl.
USPC ............ 713/176; 713/170; 713/189; 713/193

(58) Field of Classification Search
CPC ....... G06F 21/33; G06F 21/64; H04L 9/3073; H04L 9/3236; H04L 9/3247; H04L 9/3263; H04L 63/0442; H04L 63/0823; H04L 63/12; H04L 63/123; H04L 2209/20; H04L 2209/68
USPC .................... 713/170, 176, 189, 193; 726/22; 380/259; 709/246
See application file for complete search history.

(56) References Cited

U.S. PATENT DOCUMENTS

| 5,515,532 | A * | 5/1996 | Iijima ............................ 707/821 |
| 6,796,489 | B2 | 9/2004 | Slater et al. |
| 6,959,382 | B1 | 10/2005 | Kinnis et al. |
| 7,451,321 | B2 | 11/2008 | Dryer |
| 7,533,268 | B1 | 5/2009 | Catorcini et al. |
| 7,568,101 | B1 | 7/2009 | Catorcini et al. |
| 8,032,759 | B2 | 10/2011 | Goldman et al. |
| 2003/0120931 | A1 | 6/2003 | Hopkins et al. |
| 2004/0181756 | A1* | 9/2004 | Berringer et al. ............. 715/530 |
| 2007/0204340 | A1 | 8/2007 | Karamchedu et al. |

(Continued)

FOREIGN PATENT DOCUMENTS

JP 2003143136 A 5/2003

OTHER PUBLICATIONS

"National Imagery Transmission Format Version 2.1" by Department of Defense, published May 1, 2006 (retrieved on May 4, 2013 at: http://www.gwg.nga.mil/ntb/baseline/docs/2500c/2500C.pdf).*

(Continued)

*Primary Examiner* — Joseph P. Hirl
*Assistant Examiner* — Kalish Bell
(74) *Attorney, Agent, or Firm* — Ronald E. Prass, Jr.; Prass LLP

(57) ABSTRACT

A system and method are provided for implementing a digital signature scheme for embedding and validating multiple nested digital signatures in digitally produced documents without modifying a file size of the digitally produced and signed documents or otherwise corrupting previously-embedded digital signatures. A number of fixed fields are included in a digitally produced document, upfront, that will be populated with multiple digital signatures. With the fixed fields in the digitally produced documents, the entire file is cryptographically "hashed" and the individual digital signatures are independently verifiable via simple cryptographic schemes. Multiple digital signatures are embedded in documents including complex file formats in a manner that does not corrupt the documents. Known cryptographic techniques such as, for example, a known hash algorithm, are applied to the digitally produced documents including the multiple sequentially input digital signatures in a process that is independently verifiable.

21 Claims, 8 Drawing Sheets

(56) References Cited

U.S. PATENT DOCUMENTS

| | | |
|---|---|---|
| 2008/0104666 A1 | 5/2008 | Dillaway |
| 2010/0037062 A1* | 2/2010 | Carney .................. 713/176 |
| 2010/0114674 A1 | 5/2010 | Daza Fernandez et al. |
| 2010/0185867 A1 | 7/2010 | Izu et al. |
| 2011/0107107 A1 | 5/2011 | Gantman et al. |

OTHER PUBLICATIONS

Adobe Systems, Incorporated; Digital Signatures in the PDF Language; 2006; San Jose, CA USA.

Albert Levi et al.; Integrity Control in Nested Certificates; Bogazici University, Department of Computer Engineering; Bebek, Istanbul Turkey 1999.

Albert Levi et al.; NPKI: Nested Certificate Based Public Key Infrastructure; Bogazici University, Department of Computer Engineering; Bebek, Istanbul Turkey 1998.

Ronald L. Rivest, Massachusetts Institute of Technology; Cambridge, MA 02139 & Butler Lampson, Microsoft Corporation; SDSI—A Simple Distributed Security Infrastructure; Wednesday Oct. 2 8:18 PM EDT 1996.

* cited by examiner

NESTED DIGITAL SIGNATURES WITH CONSTANT FILE SIZE

BACKGROUND

1. Field of the Disclosed Embodiments

This disclosure relates to systems and methods for implementing a digital signature scheme for embedding and validating multiple nested digital signatures in a digitally produced document without modifying a file size of the digitally produced and signed document.

2. Related Art

Conventionally, the terms "digital signatures," and "schemes for implementing digital signatures," are generally understood to refer to a class of computing techniques that apply mathematical algorithms as encryption techniques to digitally produced documents. An objective of applying digital signatures to a digitally produced document is to demonstrate the authenticity of a digitally produced and signed document. Recipients rely on valid and verifiable digital signatures as an indication that the digitally produced document (a) was created by a known entity/author, and (2) has not been altered in transmission to the recipient, including in any intervening review process.

Multiple digital signatures may be applied to a digitally produced document in order to indicate a chain of custody, or otherwise to indicate a list of individuals who have accessed the digitally produced and signed document. Digital signatures are commonly used for applications in which it is important to be able to detect alteration of the digitally produced documents. Digital signatures also aid in potentially providing a list of individuals who may have altered the digitally produced and signed document once an unauthorized alteration is detected.

Digital signatures, in this context, refer to a subset of what could be considered to constitute electronic signatures. The latter term refers to a broader class of electronic data that is intended to convey the intent of a signature on a paper produced and ink signed document. Digital signatures make use of differing levels of cryptographic methods in order to provide an ability not only to verify the digitally produced document, but also to verify and validate the applied signatures. Although basically equivalent to traditional handwritten signatures, digital signatures are much more difficult to forge based on the application of these cryptographic techniques. As organizations move away from paper documents with ink signatures, digital signatures can provide added assurances of authenticity, accuracy and integrity of the digitally produced and signed documents.

Typically, there are two general categories of techniques for applying digital signatures to digitally produced documents.

The first, and perhaps most commonly employed, general category of digital signature applying techniques "wraps" the digitally produced document in a digitally signed "envelope." A shortfall of these digital signature applying techniques is that such a "wrapped" file is no longer readily identifiable as the original file in the original file format until the file is "unwrapped." Additionally, the "unwrapping" effectively detaches the digital signature from the digitally produced and signed document. In so doing, the unwrapping breaks the association of digital signature with the digitally signed document. As such, even though the wrapping technique may be able to wrap the digitally produced document in multiple layers of wrapping corresponding to multiple individual and separate digital signatures, the effective detachment of the one or more of the digital signatures, in sequence, from the digitally produced and signed document may present difficulties in preserving and defending any chain of evidence or chain of custody of the digitally produced document.

The second general category of digital signature applying techniques involves embedding the digital signature within the digitally produced document itself This method, while forensically stronger because the embedded signature cannot be stripped off, can result in alteration of the digitally produced document. In other words, because the digital signature is embedded in the digitally produced document, the content of the digitally produced document is effectively changed with the embedding of the digital signature in the digitally produced document. Additionally, the size of the digitally produced document is necessarily changed with the inclusion of the digital signature. Finally, these embedding digital signature applying techniques have generally been considered impossible to effectively implement with regard to multiple digital signatures. The difficulty lies in the fact that the addition of a second digital signature, in sequence after the first digital signature, generally corrupts the first digital signature thereby rendering difficult precise reconstruction of, for example, a chain of custody for, or a list of individuals who had access to, the digitally produced and signed document.

With the wide proliferation of all manner of digitally produced documents, as government agencies and business entities move away from paper produced and ink signed documents and recordkeeping, techniques and methods for applying digital signatures in a manner that meets an objective of maintaining a clean, unalterable, verifiable and readily accessible list of individuals who produced, reviewed or otherwise accessed, a digitally produced and signed document are increasingly essential to preservation of the information produced and in deterring alteration of the digitally produced and signed documents.

SUMMARY OF THE DISCLOSED EMBODIMENTS

In view of the above-identified shortfalls in current techniques for applying digital signatures, and particularly for applying multiple digital signatures, to a digital document, it would be advantageous to provide a system and method that would address these known shortfalls. In other words, as requirements for digital signatures increase, and particularly as the required level of forensic defensibility attributable to a digital signature scheme for many applications increases, including, for example, to meet intelligence community requirements for protecting acquired data, and to meet financial institution needs for accurately undertaking and tracking financial transactions, there is an increasing need to find a manner by which to simply and effectively "affix" multiple digital signatures to digital documents. Any such digital signature scheme should include a capability to affix the multiple digital signatures to the digital document in a manner that the multiple digital signatures (1) remain affixed to, i.e. not stripped off of, the digital document throughout processing of the digital document, and (2) remain uncorrupted with the addition of subsequent digital signatures to the digital document.

In various exemplary embodiments, the systems and methods according to this disclosure may provide a simple solution to address the above-identified shortfalls in prior art digital signature schemes by providing a manner by which multiple nested digital signatures may be embedded in a digital document without changing the size of the digital document or otherwise corrupting previously-embedded digital signatures.

In various exemplary embodiments, the systems and methods according to this disclosure may provide for the inclusion of a number of fixed fields in the digital document, upfront, with the intention that these fixed fields will be populated with multiple nested digital signatures. The provision of the fixed fields in the digital document is intended to ensure that the entire file is cryptographically "hashed" and that the individual digital signatures are independently verifiable via a simple cryptographic scheme.

In various exemplary embodiments, the systems and methods according to this disclosure may provide a capability for embedding multiple digital signatures in digital documents including complex file formats in a manner that does not corrupt the data provided in these digital documents.

In various exemplary embodiments, the systems and methods according to this disclosure may apply known cryptographic techniques such as, for example, a known hash algorithm, to a digital document including multiple sequentially input digital signatures in a process that was previously considered impossible. In this manner, the systems and methods according to this disclosure preserve a chain of review of the digital document from the individual who originally produced and digitally signed the digital document through a series of multiple individual users who may independently access and review the digital document. Based on the ability of these techniques to preserve, in an uncorrupted manner, a list of these individuals, the systems and methods according to this disclosure may ultimately provide a capacity to produce this list of individuals in a manner that would be acceptable to, for example, court review.

In various exemplary embodiments, the systems and methods according to this disclosure may provide government agencies, business entities, financial institutions and medical professionals, among others, with a stronger, more forensically defensible, digital signature scheme for digital documents. The systems and methods according to this disclosure may find applicability in a wide range of digital documents including, but not limited to, electronic health records, financial records, law enforcement chains of custody for digital evidence, e-science, law firm electronic correspondence and filings, myriad electronic public records such as voting records and the census, commercial vehicle, particularly, commercial air transport, maintenance logs, and other like documents the content of which should be maintained in an unaltered state once it has been initially prepared and reviewed prior to dissemination.

In various exemplary embodiments, the systems and methods according to this disclosure may prove particularly adaptable to complex file formats including, for example, National Imagery Transmission Format (NITF).

In various exemplary embodiments, the systems and methods according to this disclosure may prove particularly adaptable to the Lockheed Martin proprietary Radiant Mercury system.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing a digital signature scheme for embedding and validating multiple nested digital signatures in a digital document will be described, in detail, with reference to the following drawings, in which.

DETAILED DESCRIPTION OF THE DISCLOSED EMBODIMENTS

Figure 1:
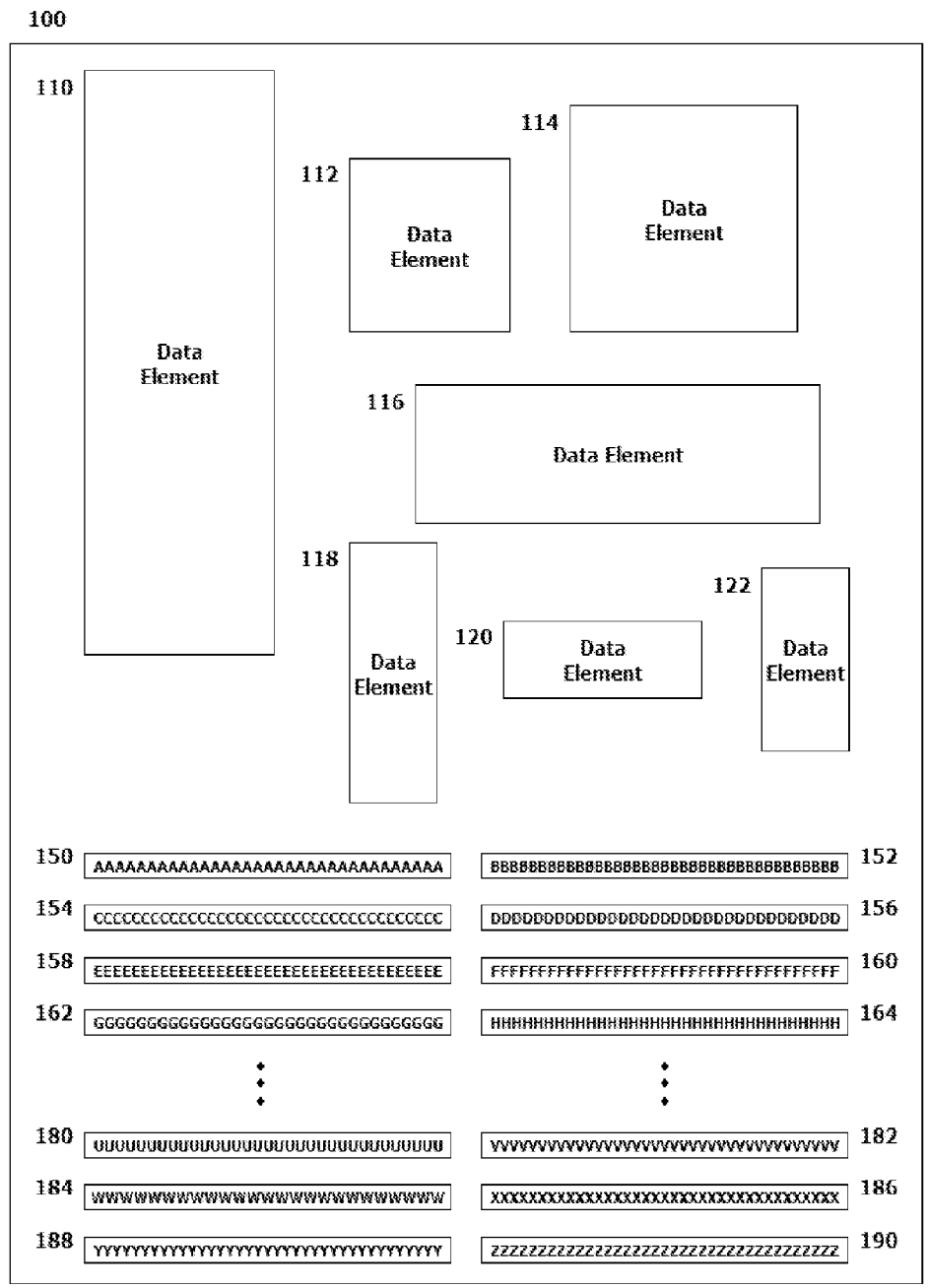
FIG. 1 illustrates an exemplary embodiment of a digital document in a complex file format with a number of individual fields appended to the digital document for the inclusion of digital signatures according to a first step in a digital signature scheme implemented according to this disclosure.

The systems and methods for implementing a digital signature scheme for embedding and validating multiple nested digital signatures in a digital document, particularly without modifying a file size of the digital document according to this disclosure will generally refer to this specific utility for those systems and methods. Exemplary embodiments described and depicted in this disclosure should not be interpreted as being specifically limited to any particular configuration, or directed to any particular intended use. In fact, any digital signature scheme that may benefit from a part or all of the systems and methods according to this disclosure is contemplated. Specific reference to, for example, any particular computing scheme or system, any specific cryptographic "hash" algorithm, any specific digital signature algorithm, standard, or format, or any individual complex file format for a produced digital document, should be understood as being exemplary only, and not limiting, in any manner, the disclosed subject matter to any particular class of schemes, systems, algorithms or document file formats. In the examples that follow, the digital signature scheme shown is simplistic in the interest of clarity; it may lack some features of certain digital signature schemes that make them secure and efficient, such as timestamps, and use of a stronger hash function than the referenced MD5 hash function. Nothing in the detailed description or claims should be construed to mean that a standards-compliant digital signature format, such as PKCS, could not be employed here instead of a raw encrypted hash value with no timestamp. In fact, for interoperability with other systems, formatting the digital signatures herein in a way compatible with PKCS may be preferable. Specific references will, for example, be made only where it is appropriate to provide such references as examples for clarity and ease of understanding. The systems and methods according to this disclosure are understood, for example, as being particularly adaptable to intelligence documents in the complex file format known as National Imagery Transmission Format (NITF), as read from and written to by the Lockheed Martin proprietary Radiant Mercury® system.

It is anticipated that the systems and methods according to this disclosure may be adaptable to use in any cryptographic scheme that is undertaken by any computing system involved in encrypting, or otherwise securing, many different classes of digital documents according to multiple file formats. Computing systems that may benefit from the systems and methods according to this disclosure may include those that produce and process documents for the worldwide intelligence, defense, medical, and financial communities among others. Virtually any digital document that may be encrypted, and may therefore, benefit from, or otherwise require, multiple digital signatures in order to ensure a verifiable chain of custody or to provide a reproducible chain of access to the digital document is contemplated.

Individual features and advantages of the disclosed systems and methods will be set forth in the detailed description that follows, and will be, in part, obvious from the detailed description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this also is done for illustration purposes only. A person of ordinary skill in the relevant art may recognize that other components and configurations may be used without departing from the spirit and scope of the subject matter of this disclosure.

Various aspects of the disclosed embodiments relate to a system and a method for implementing a digital signature scheme for embedding and validating multiple nested digital signatures in a digital document, and specifically for doing so without modifying a file size of the digital document once the digital document is initially produced and signed. These systems and methods may provide a robust, non-corruptible and forensically defensible list of those who reviewed or otherwise accessed the digital document. The systems and methods according to this disclosure may employ a corresponding computer-readable medium, with a program stored thereon, which is accessible by a computing system to implement the disclosed methods.

FIG. 1 illustrates an exemplary embodiment of a digital document 100 produced in a complex file format. As shown in FIG. 1, and as is commonly understood, an exemplary digital document 100 may be produced by a system or application according to a user's (digital document author's) inputs. The exemplary digital document 100 may include one or more individual data elements 110-122. These one or more individual data elements 110-122, although shown generically with the element identifier "data element" in FIG. 1, may include various complex data or file formats with, for example, numerous pieces and types of data and/or multiple subfields in some or all of the one or more individual data elements 110-122. It should be understood that, although depicted as a single page in FIG. 1, and several of the Figures that follow, for simplicity in depiction and ease of understanding, the exemplary digital document 100 may include multiple pages of individual data elements 110-122.

As shown in FIG. 1, the exemplary digital document 100 may have appended to, or inserted into, it a number of individual data fields 150-190. These individual data fields 150-190 may be added to the exemplary digital document 100 based on an input by the digital document author selecting, for example, a specified number of the added individual data fields 150-190, or may be automatically added to the exemplary digital document 100 by the system or application by which the exemplary digital document 100 is produced according to a predetermined routine in the system or application. For example, when the exemplary digital document 100 is produced as an NITF document, Registered Tagged Record Extensions (RTRE) may be employed as the method for adding some specified number of individual data fields 150-190.

The number of added individual data fields 150-190 will limit the number of individual digital signatures that can ultimately be accommodated by the digital signature scheme. With a first pair of the added individual data fields 150-190 being reserved for a digital signature of the digital document author, and at least one subsequent pair of the added individual data fields 150-190 being reserved for the system or application to add a digital signature of the system or application based on a validation of the digital signatures of individual users of the exemplary digital document 100, a number of other added individual data fields 150-190 should be determined up front to allot a pair of the added individual data fields 150-190 to each of an anticipated number of subsequent reviewers/users of the exemplary digital document 100.

When the digital document author has completed producing the exemplary digital document 100, the system or application by which the exemplary digital document is produced may add the predetermined or preselected number of the individual data fields 150-190 to the end of the exemplary digital document 100, or otherwise in some appropriate place embedded within the exemplary digital document 100.

The system or application may then write known values as data strings of "filler" data into each of the added individual data fields 150-190. Examples of such "filler" data are shown as the repeated letters "A"-"Z" in FIG. 1. The exact content of the "filler" data may be individually selected. The only requirement may be that the digital document author, the system or the application by which the exemplary digital document 100 is produced, and each of the subsequent reviewers, should understand, and/or agree on, the content of the "filler" data for the added individual data fields 150-190. The reason for such agreement or understanding will become clear in the discussion regarding further processing of the exemplary digital document 100 and the multiple digital signatures appended to the exemplary digital document 100 below.

In like manner, the precise size of the added individual data fields 150-190 may be individually selected. The precise size of each of the added individual data fields 150-190 must be large enough to accommodate a specifically formatted user name, or other identifier, which may appear in the first of the in use pair of the added individual data fields 150-190 for each user, or an associated encrypted seal or digital signature, e.g., an encrypted hash value associated with the specifically formatted user name, which may appear in the second of the in use pair of the added individual data fields 150-190 for each user. The system or application may specify a precise size of the added individual data fields 150-190 in a manner that may allow a reader of the exemplary digital document 100 that is not interested in the contents of the added individual data fields 150-190 to simply ignore them.

In accordance with the above discussion, the finally prepared exemplary digital document 100 with the added individual data fields 150-190 will have a resultant file size. The digital signature scheme will not alter that resultant file size throughout any level of subsequent review and update of the multiple digital signatures by which the exemplary digital document 100 is signed. According to the discussion below, each digital signature will replace the filler data in a pair of the added individual data fields 150-190, thereby maintaining the original resultant file size throughout any processing of the exemplary digital document 100.

Once the system or application adds the individual data fields 150-190, the system or application may then apply a cryptographic scheme, such as, for example, an encrypting hash scheme, over the exemplary digital document 100 expanded with the appended individual data fields 150-190 containing the generic "filler" data.

When, for example, an encrypting hash scheme, such as the known MD5 hash scheme or other like known hash scheme, is used, the encrypting hash scheme may render a resultant hash value. The resultant hash value may be a small block of data ("hash value/data") that is approximately the same size as one of the added individual data fields 150-190.

The system or application may then access a stored encryption key that is, for example, associated with the digital document author. The hash value/data may be encrypted using the stored encryption key associated with the digital document author. The resulting encrypted seal represents the digital signature (which terms may be used interchangeably throughout this disclosure) of the digital document author.

It should be noted that the stored encryption key need not be known to, or accessible by, the digital document author. Rather, the system or application may recognize the identity of the digital document author based on, for example, the digital document author's identifying information (username and/or password) used to gain access to the system or application. Otherwise, the system or application may specifically request identification of the digital document author by providing a query to which the digital document author may respond, thereby identifying the digital document author to the system or application in order that identification of the digital document author and selection of an appropriate stored encryption key associated with the digital document author may be provided to, or selected by, the system or application. Such a query may, for example, provide an additional layer of protection by guarding against another user that is not the digital document author attempting to pass himself or herself off as the digital document author in a circumstance in which the digital document author may, for example, leave the workstation unattended after logging into the system or application.

The system or application may maintain and routinely update a file that associates user names with encryption keys. This file may be controlled by the system or application and may not be routinely accessible to any particular user.

The system or application may replace the "filler" data in the first pair of the added individual data fields 150,152 in the exemplary digital document 100 shown in FIG. 1 with data as follows. The "filler" data in the first of the individual added data fields 150 may be replaced with the user name for the digital document author. The "filler" data in the second of the individual added data fields 152 may be replaced with the above-described derived resulting encrypted seal that represents the digital signature of the digital document author. A resulting exemplary digital document 100A implementing the digital signature scheme according to this disclosure may appear as shown in FIG. 2.

The digital document author may then forward the digitally signed digital document 100A to a first digital document reviewer. Otherwise, the system or application may forward the digitally signed digital document 100A to the first digital document reviewer. The system or application may, alternatively, simply store the digitally signed digital document 100A for further processing by one or more digital document reviewers, or for access by one or more digital document users.

A first or subsequent reviewer or user of the digitally signed digital document 100A may access the digitally signed digital document 100A. If a reviewer chooses to accept the digitally signed digital document 100A, or a user's use of the digitally signed digital document 100A must be recorded, that reviewer/user may cause the system or application to perform certain additional processing steps for the disclosed digital signature scheme as follows.

Figure 2:
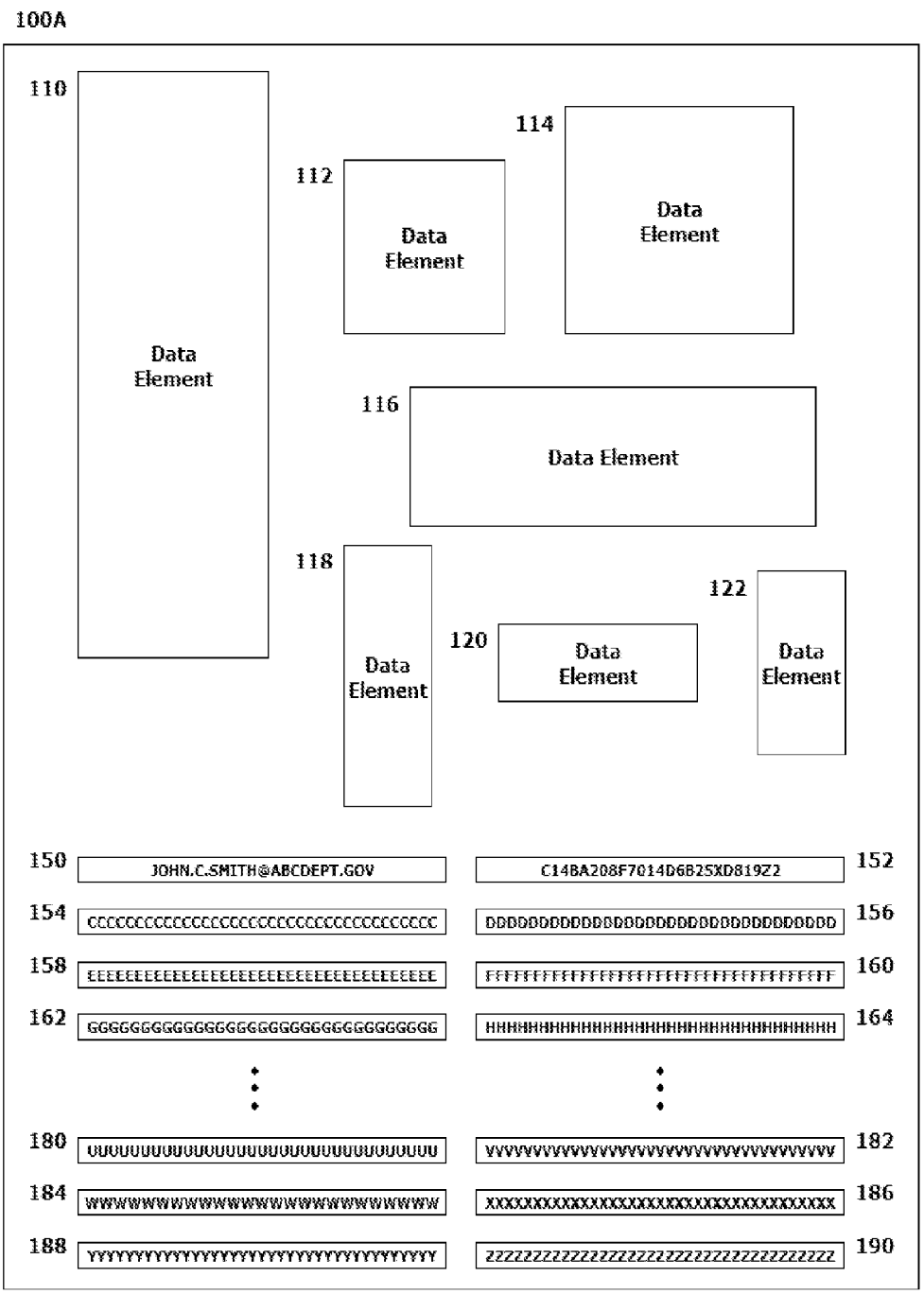
FIGS. 2-5 illustrate a series of exemplary modifications to the exemplary embodiment of the digital document shown in FIG. 1 according to subsequent steps in a digital signature scheme implemented according to this disclosure.

The system or application may apply the cryptographic scheme, such as the encrypting hash scheme, over the digital document 100A as shown in FIG. 2 that now includes the first of the individual added data fields 150 with the user name for the digital document author, the second of the individual added data fields 152 with the encrypted seal that represents the digital signature of the digital document author, and the appended individual data fields 154-190 containing the generic "filler" data shown as the repeated letters "C"-"Z." The system or application may thus generate new hash value/data, different from the hash value/data generated according to the action of the digital document author.

The system or application may then access a stored encryption key that is, for example, associated with the digital document reviewer/user. The hash value/data may be encrypted using the stored encryption key associated with the digital document reviewer/user. The resulting encrypted seal represents the digital signature of the digital document reviewer/user.

As above, the stored encryption key need not be known to, or accessible by, the digital document reviewer/user. Rather, the system or application may recognize the identity of the digital document reviewer/user in the same manner as described above that the system or application may recognize the identity of the digital document author and recover the associated stored encryption key according to the recognized identity of the digital document reviewer/user.

Figure 3:
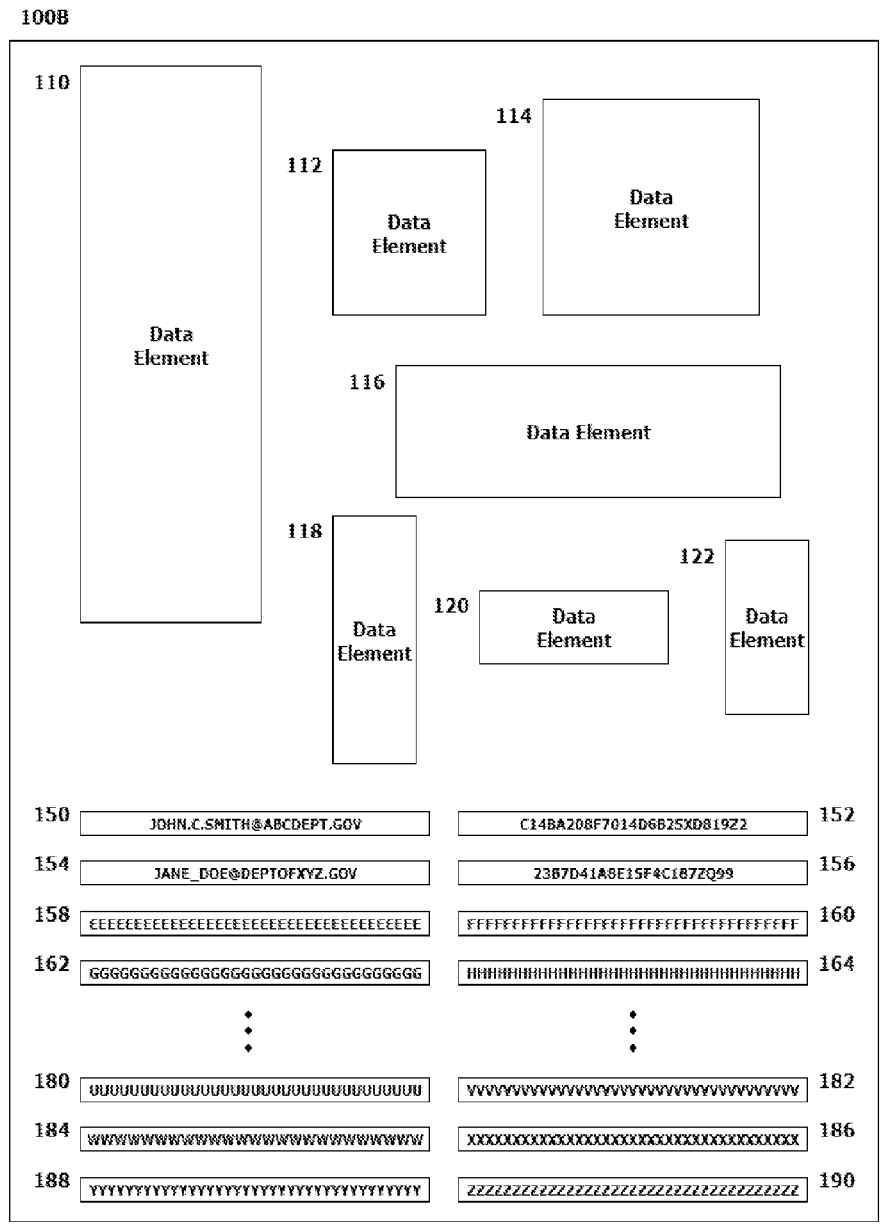

The system or application may replace the "filler" data in a second pair of the added individual data fields 154,156 in the exemplary digital document 100A shown in FIG. 2 with data as follows. The "filler" data in the first of the individual added data fields 154 of the second pair may be replaced with the user name for the digital document reviewer/user. The "filler" data in the second of the individual added data fields 156 of the second pair may be replaced with the above-described derived resulting encrypted seal that represents the digital signature of the digital document reviewer/user. A resulting digital document 100B implementing the digital signature scheme according to this disclosure may appear as shown in FIG. 3.

The digital document reviewer/user may then forward, store or otherwise make available the multiply digitally signed digital document 100B to the system or application for validation, or to another reviewer/user for review/use.

The system or application may perform certain additional processing steps for validating the multiple digital signatures.

The system or application may first validate an authenticity of the digital document reviewer/user by the following procedure. The system or application may extract the user name of the digital document reviewer/user and the encrypted seal that represents the digital signature of the digital document reviewer/user from the third and fourth added individual data fields 154,156, and temporarily replace the user name and the encrypted seal with the previously-included "filler" data resulting in the digital document 100A as shown in FIG. 2. This action is taken to temporarily modify the multiply digitally signed digital document 100B in order that the system or application, in this validation step, is operating on the same digital document with the same data that the digital document reviewer/user was operating on when the digital document reviewer/user caused the inclusion of the digital document reviewer's/user's user name and the generation and inclusion of the digital document reviewer's/user's encrypted seal/digital signature.

The system or application may then apply the cryptographic scheme, such as the encrypting hash scheme, over the temporarily modified digital document 100A as shown in FIG. 2 that still now includes the first of the individual added data fields 150 with the user name for the digital document author, the second of the individual added data fields 152 with the encrypted seal that represents the digital signature of the digital document author, and the appended individual data fields 154-190 containing the generic "filler" data shown as the repeated letters "C"-"Z." The system or application may thus generate first review hash value/data.

The system or application may then access the stored encryption key for the digital document reviewer/user. The system or application may then encrypt generated first review hash value/data using the stored encryption key for the digital document reviewers/user. This action of the system or application may yield a first validating encrypted seal/digital signature.

The system or application may then compare the first validating encrypted seal/digital signature with the encrypted seal/digital signature of the digital document reviewer/user that the system or application extracted from the multiply signed digital document, such as the exemplary in process digital document 110B shown in FIG. 3, upon receipt. If, as a result of the comparison, the system or application determines that the two encrypted seals/digital signatures do not match, the system or application may then reject the digital document, stop further processing of the digital document, audit the event and/or take such other action as may be appropriate to alert other users of the digital document, or an agency or entity exercising control over the digital document, that the content of the digital document is unreliable, has been altered, or is otherwise compromised.

The system or application may provide such alert according to any manner of conventional systems such as, for example, by generating a textual warning that may be automatically distributed to users and potential users of the digital document, providing an indication of unreliability of the digital document on a display device associated with the system or application, marking the digital document with an indication of unreliability of the digital document, or other like means for alerting potential users of the digital document of its unreliability, or for alerting the agency or entity exercising control over the digital document that further action regarding the digital document, and detected alteration of the digital document, may be warranted.

If, on the other hand, no mismatch is detected in the above-described first step of the validation scheme, the system or application may proceed with further validation steps as follows. The system or application may next validate an authenticity of the digital document author in a manner similar to that described above. The system or application may next extract the user name of the digital document author and the encrypted seal that represents the digital signature of the digital document author from the first and second added individual data fields 150,152, and in the temporarily modified in process validating document, and replace the username and the encrypted seal with the previously-included "filler" data resulting in the exemplary digital document 100 as shown in FIG. 1. This action is taken to temporarily modify the multiply digitally signed digital document 100B/A in order that the system or application, in this validation step, is operating on the same data that the digital document author was operating on when the digital document author caused the inclusion of the digital document author's user name and the generation and inclusion of the digital document author's encrypted seal/digital signature in the digital document generation process.

The system or application may then apply the cryptographic scheme, such as the encrypting hash scheme, over the new temporarily modified exemplary digital document 100 as shown in FIG. 1 that now includes only the appended individual data fields 150-190 containing the generic "filler" data shown as the repeated letters "A"-"Z." The system or application may thus generate a second review hash value/data.

The system or application may then access the stored encryption key for the digital document author. The system or application may then encrypt generated second review hash value/data using the stored encryption key for the digital document author. This action of the system or application may yield a second validating encrypted seal/digital signature. The system or application may then compare the second validating encrypted seal/digital signature with the encrypted seal/digital signature of the digital document author that the system or application extracted from the multiply signed digital document, such as the exemplary in process digital document 110A shown in FIG. 2 as processing of the validation continues. If, as a result of the comparison, the system or application determines that the two encrypted seals/digital signatures do not match, the system or application may then reject the digital document, stop further processing of the digital document, audit the event and/or take such other action as may be appropriate to alert other users of the digital document, or an agency or entity exercising control over the digital document, that the content of the digital document is unreliable, has been altered, or is otherwise compromised, in the manner described above.

It should be recognized that the above-described validation scheme can be undertaken by the system or application for multiple reviewers/users of the multiply signed digital document.

When the validation scheme is complete for all of the reviewers/users of the digital document, and for the author of the digital document, and no mismatch is detected, the system or application may undertake further processing steps, for example, to "seal" the multiply signed digital document. Such additional processing may be undertaken, for example, when it is determined that no further processing will occur with regard to the multiply signed digital document.

In an intelligence community context, such further processing may occur, for example, when the digital document is to be downgraded in terms of its classification level, or otherwise sanitized.

Generally, when it is determined that no further review or use is to be undertaken with regard to the multiply signed digital document by any individual with a capability to alter or otherwise modify the multiply signed digital document, the system or application may reinsert the individual user names for the digital document author and reviewers/users, along with their associated encrypted seals/digital signatures in the respective added individual data fields from which this data was extracted during the validation process.

The system or application may then once again apply the cryptographic scheme, such as the encrypting hash scheme, over the entire exemplary digital document 100B as shown in FIG. 3 as it was received to generate a sealing hash value/data.

The system or application may then apply its own encrypted seal/digital signature to "seal" the multiply signed digital document. The system or application may then access a stored encryption key that is, for example, associated with the system or application. The sealing hash value/data may be encrypted using the stored encryption key associated with the system or application. The resulting encrypted seal represents the digital signature of the system or application. The encrypted seal/digital signature of the system or application may be one that can be easily recognized by other related systems or applications thereby verifying the integrity of the multiply signed, and now sealed, digital document.

Figure 4:
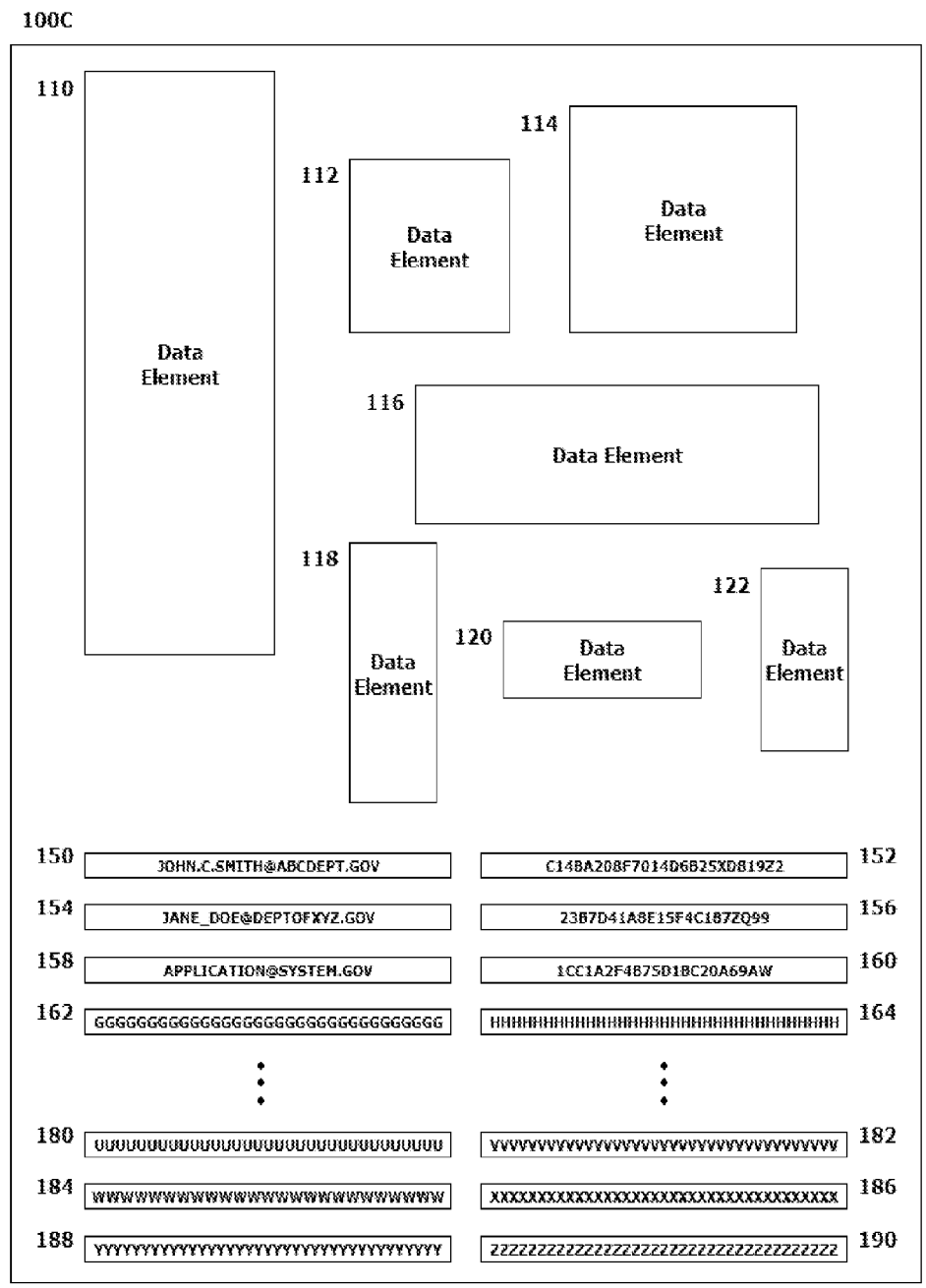

The system or application may replace the "filler" data in a third or subsequent pair of the added individual data fields 158,160 in the digital document 100B shown in FIG. 3 with data as follows. The "filler" data in the first of the individual added data fields 158 of the third or subsequent pair may be replaced with some user name assigned to the system or application that may be globally recognizable. The "filler" data in the second of the individual added data fields 160 of the third or subsequent pair may be replaced with the above-described encrypted seal that represents the digital signature of the system or application. A resulting sealed digital document 100C implementing the digital signature scheme according to this disclosure may appear as shown in FIG. 4.

Figure 5:
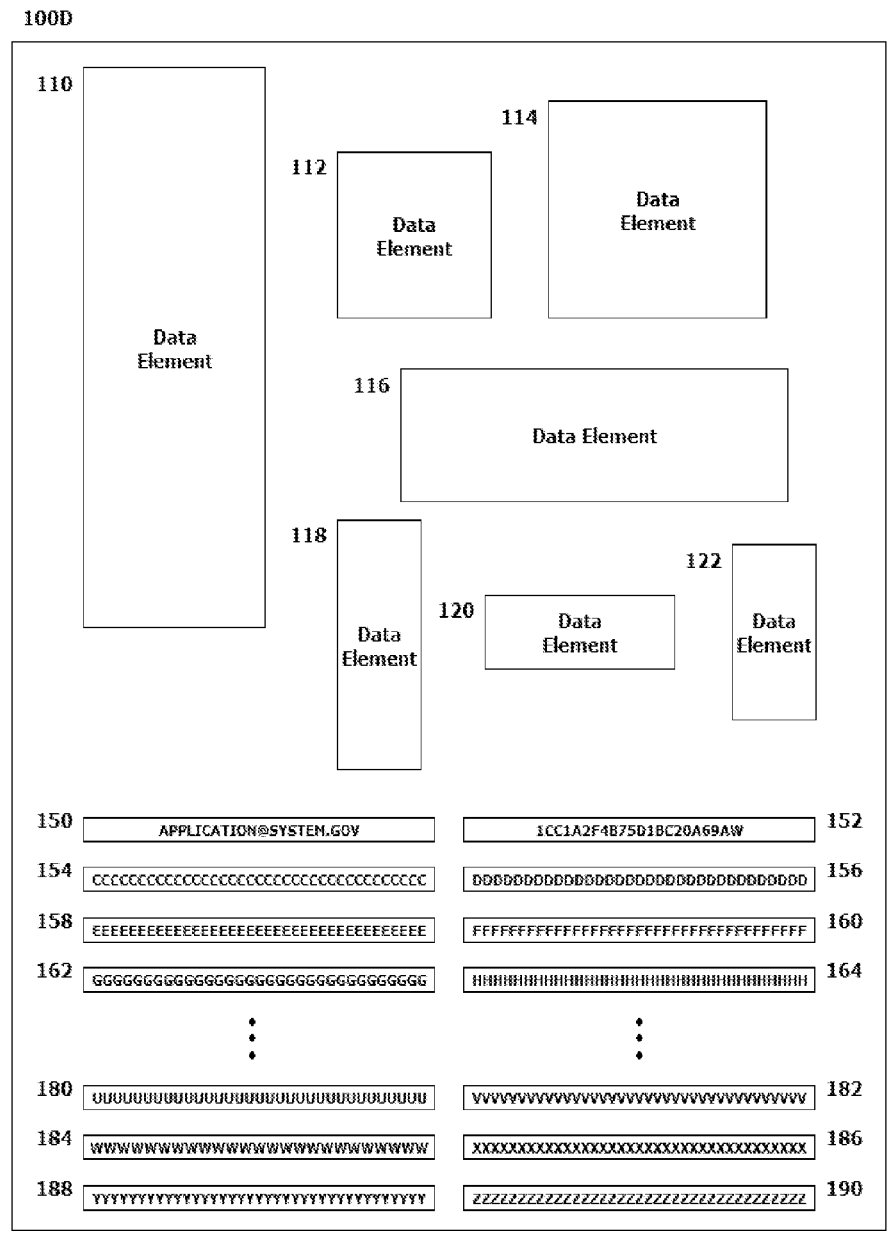

Alternatively, there may be instances in which, once the validating and sealing process is undertaken by the system or application, there is no longer a need to preserve any reference to the digital document author or the digital document reviewers/users. In such circumstances, once the validation process undertaken according to the above steps is completed, and no mismatch is found, the system or application may forego reinserting the individual user names for the digital document author and reviewers/users, along with their associated encrypted seals/digital signatures, in the respective individual data fields from which this data was extracted during the validation process. The system or application may simply replace the "filler" data in the first pair of added individual data fields 150,152 with the user name assigned to the system or application that may be globally recognizable and the above-described encrypted seal that represents the digital signature of the system or application, respectively. This may be the preferable final step in instances where, for example, in the validating process, the system or application may modify the digital document, such as to downgrade or sanitize the digital document when the digital document is produced and used in an intelligence context. By its nature, downgrading or sanitizing of an intelligence community produced digital document may necessarily result in modifying the digital document in a manner that renders the previous author's and reviewers' encrypted seals/digital signatures invalid. Generally, the sealed the digital document will then appear to have been authored by the system or application. A resulting sealed exemplary digital document 100D implementing the digital signature scheme according to this disclosure may appear as shown in FIG. 5.

Accordingly, the system or application may render from the validation steps of the digital signature scheme a digital document that is in a form (1) that it was received including the user names and encrypted seals/digital signatures of the digital document author and one or more digital document reviewers/users; (2) that it was received including the user names and encrypted seals/digital signatures of the digital document author and one or more digital document reviewers/users and a user name associated with the system or application along with its own encrypted seal/digital signature; or (3) different from that which was received by removing the user names and encrypted seals/digital signatures of the digital document author and the one or more digital document reviewers/users and substituting the user name associated with the system or application along with its own encrypted seal/digital signature representing the system or application as the digital document author. In the circumstances where the system or application includes the user name associated with the system or application along with its own encrypted seal/digital signature, the digital document may be considered to be sealed by the system or application. It will be recognized according to the above discussion that, if the system or application renders, from the validation steps of the digital signature scheme, a digital document that is in a form (3) as discussed above, further audit, verification or validation of a chain of custody or access to the digital document including by the author of the digital document and reviewers/users of the digital document may be nullified.

It should be understood that users of the system or application will generally be unable to access the encryption key for the system or application. Because the encryption key for the system or application must be generally recognizable, all related systems or applications may have access to the same encryption key information. There may occur instances when the encryption key information for the system or application is changed. In such instances, all related systems or applications must either be simultaneously changed, or at least must be made aware of the change in the encryption key information for the specific system or application in order to continue to have access to the previously sealed multiply signed digital documents.

In order to facilitate changes in an encryption key for an individual system or application, while still allowing archived digital documents that were sealed with a previously-active encryption key to remain valid, individual additional steps may be undertaken. These individual additional steps may include, for example, maintaining a historical list of valid encryption keys, indexed, for example, by dates of validity; maintaining a related encryption key revocation list; or other like steps to preserve previously-used encryption key information.

Because the system or application always applies the cryptographic scheme, such as the encrypting hash scheme, over the entire digital document, the integrity of the entire digital document is easily verified. Those of skill in the art will recognize that, if even a single bit of data contained in any field of the digital document is changed, when the cryptographic scheme, such as the encrypting hash scheme, is applied over the entire document, the resulting hash value/data will be necessarily changed. It is for this reason that the implemented digital signature scheme described in this disclosure, in each instance, applies the cryptographic scheme by hashing the file, the entire file, and nothing but the file.

Figure 6:
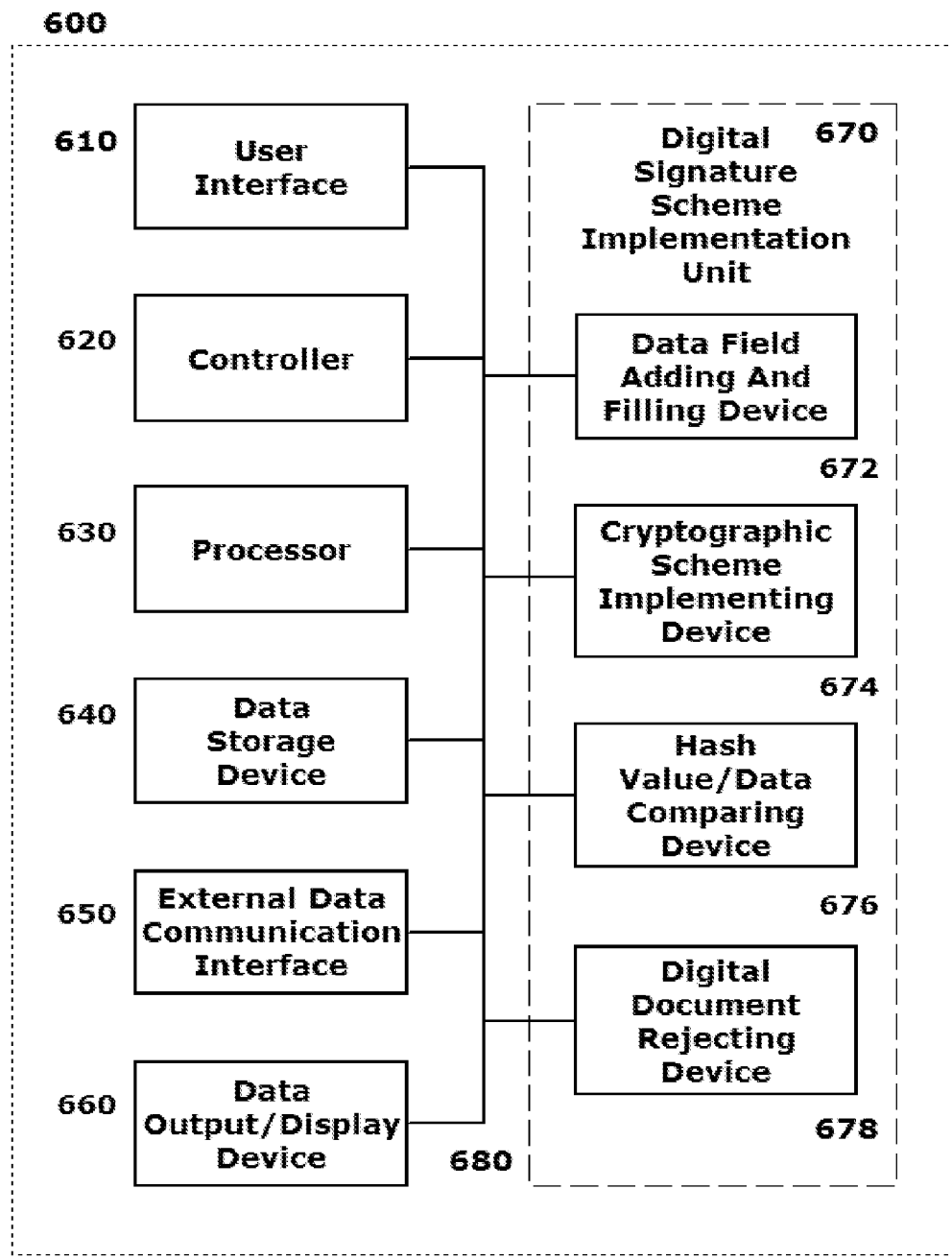
FIG. 6 illustrates a block diagram of an exemplary system for implementing a digital signature scheme for embedding and validating multiple nested digital signatures in a digital document according to this disclosure.

FIG. 6 illustrates a block diagram of an exemplary system 600 for implementing a digital signature scheme for embedding and validating multiple nested digital signatures in a digitally produced document according to this disclosure. The exemplary system 600 shown in FIG. 6 may be embodied as a standalone system supporting a system that is used to produce digital documents, or otherwise may be integrally incorporated into the system that is used to produce the digital document.

The system 600 may include a user interface 610 by which a user, such as a digital document author, digital document reviewers/user, or system administrator, may communicate directly with the system 600. The user interface 610 may be configured as one or more conventional mechanisms common to computing devices that may permit a user to input information to the system 600 in order, for example, to activate implementation of the digital signature scheme for application and validation of multiple digital signatures according to this disclosure. An objective of such activation would be to simply begin an automated process requiring little, if any, additional user interaction while the system 600 performs portions of the digital signature scheme in an automated manner at any level of preparation or review of the digital document. The user interface 610 may include, for example, an integral keyboard or attached keyboard and/or mouse by which the user may communicate with the system 600. In exemplary embodiments, a specific user interface 610 may include simply a "hot key" for activating the digital signature scheme. The user interface 610 may alternatively include (1) a touchscreen with "soft" buttons; (2) various components for use with a compatible stylus; (3) a microphone by which a user may provide oral commands to the system 600 to be "translated" by a voice recognition program or otherwise; or (4) other like device for user activation of, and communication with, the system 600.

The system 600 may include a controller 620 for controlling the functions of the system 600, particularly in crosstalk of the system 600 with the system that produces the digital document to which the implemented digital signature scheme is applied. The system 600 may also include one or more local processors 630 for individually carrying into effect implementation of the digital signature scheme. The controller 620 and the one or more processors 630 together may execute processing and control functions including data retrieval via the user interface 610 or from one or more data storage devices 640 associated with the system 600. Individually or together, the controller 620 and the one or more processors 630 may implement mathematical algorithms for cryptographic processing associated with implementing the digital signature scheme described above. Processor(s) 630 may include at least one conventional processor or microprocessor that interprets and executes instructions to direct specific processing functions with regard to a particular generated digital document. Controller 620 and processor(s) 630 may control the digital signature scheme implemented by the system 600 once that scheme is initiated by, for example, manual input by a user via the user interface 610, or otherwise based on some triggering information such as a signal identifying completion of preparation of a digital document that is to be digitally signed.

The system 600 may include one or more data storage devices 640. Such data storage device(s) 640 may be used to store data or operating programs to be used by the system 600, and specifically the processor(s) 630. Data storage device(s) 640 may store a cryptographic scheme, such as an encrypting hash scheme, to be employed as part of the digital signature scheme carried out by the system 600. Data storage device(s) 640 may also store one or more updatable files that may associate, for example, a list of user names with a respective list of encryption keys. This file may be controlled by the system 600 and may not be routinely accessible to any particular user of the system 600. Data storage device(s) 640 may include a random access memory (RAM) or another type of dynamic storage device that is capable of storing an encryption key database and separately storing instructions for execution of system operations by, for example, processor(s) 630. Data storage device(s) 640 may also include a read-only memory (ROM), which may include a conventional ROM device or another type of static storage device that stores static information and instructions for processor(s) 630. Further, the data storage device(s) 650 may be integral to the system 600, or may be provided external to, and in wired or wireless communication with, the system 600.

The system 600 may include one or more external data communication interfaces 650 by which the system 600 may communicate with components external to the system 600, such as the system that is used to produce digital documents that the system 600 supports for the implementation of the digital signature scheme.

The system 600 may include at least one data output/display device 660 which may be configured as one or more conventional mechanisms that output information to the user, including a display screen. The data output/display device 660 may separately be an output port for connection to a printer, a copier, a scanner, a multi-function device, or a remote storage medium, such as a memory in the form, for example, of a magnetic or optical disk with a corresponding disk drive or otherwise a remote data storage server. The at least one data output/display device 660 may be employed, for example, to provide a user with an indication as to whether the multiply signed digital document that the system 600 on which the digital signature scheme is implemented has been rendered unreliable by being altered or otherwise compromised in some manner that is detectable by the digital signature scheme.

The system 600 may include a specific digital signature scheme implementation unit 670 as a part of a processor 640 coupled to, for example, one or more storage devices 650, or as a separate component module or circuit in the system 600. The digital signature scheme implementation unit 670 may include one or more of the depicted elements, including: a data field adding and filling device 672, a cryptographic scheme implementing device 674, a hash value/data comparing device 676, and/or a digital document rejecting device 678.

The data field adding and filling device 672 may be specifically employed when the system 600 receives indication that the digital signature scheme should be implemented on a produced digital document to add a prescribed number of added individual data fields to the digital document according to the scheme described above. The data field adding and filling device 672 may then populate the added individual data fields with "filler" data, also in the manner described above. The data field adding and filling device 672 may add and populate such additional data fields to the digital document to arrive at a specific size for the produced digital document that will not change throughout processing of a digital signature scheme by the system 600. The data field adding and filling device 672 may also be available to populate the added individual data fields as appropriate with user names and encrypted seals/digital signatures that may be generated by the system 600 as it executes the digital signature scheme described above.

The cryptographic scheme implementing device 674 may be specifically employed to apply a particular cryptographic scheme, such as, for example, an encrypting hash scheme, over the entire digital document expanded with the appended individual data fields containing the generic "filler" data. The cryptographic scheme implementing device 674 will always hash the entire digital document including the added individual data fields regardless of how those added individual data fields are populated. A result of the system 600, via the cryptographic scheme implementing device 674, applying a cryptographic scheme to the entire digital document is generation of a hash value or hash data.

The hash value/data comparing device 676 may be employed to compare results of differing applications of the cryptographic scheme by the cryptographic scheme implementing unit 674 to like versions of the digital documents at different points in the processing of the digital document. When any comparison of the hash value/data undertaken by the hash value/data comparing device 676 determines that hash values/data that should be the same are, in fact, different, such information may be passed to a digital document rejecting device 678 that may instruct the system 600 to perform no further processing on the digital document and that may provide a user with an indication that the digital document under review by the digital signature scheme executed by the system 600 has been rendered unreliable as having been altered or otherwise compromised.

All of the various components of the system 600, as depicted in FIG. 6, may be connected by one or more data/control busses 680. These data/control bus(ses) 680 may provide wired or wireless communication between the various components of the system 600, whether all of those components are housed integrally in, or are otherwise external and connected to, the system 600.

It should be appreciated that, although depicted in FIG. 6 as an integral unit, the various disclosed elements of the system 600 may be arranged in any combination of sub-systems as individual components or combinations of components, integral to a single unit, or external to, and in wired or wireless communication with the single unit of the system 600. In other words, no specific configuration as an integral unit or as a support unit is to be implied by the depiction in FIG. 6. Further, although depicted as individual units for ease of understanding of the details provided in this disclosure regarding the system 600, it should be understood that the described functions of any of the individually-depicted components may be undertaken, for example, by one or more processors 630 connected to, and in communication with, one or more data storage devices 640.

Figure 7A:
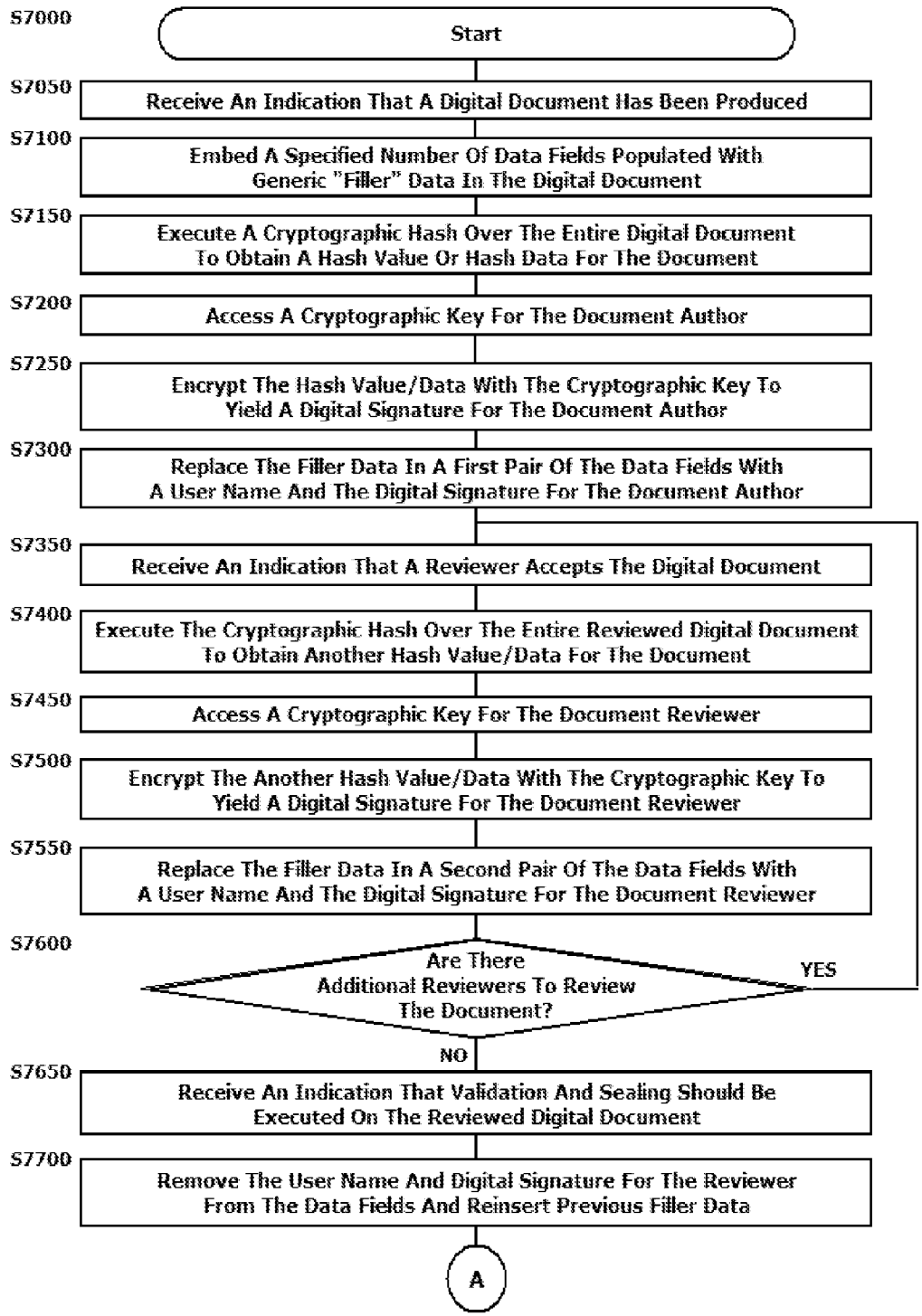
FIGS. 7A and 7B illustrate a flowchart of an exemplary method for implementing a digital signature scheme for embedding and validating multiple nested digital signatures in a digital document according to this disclosure.
Figure 7B:
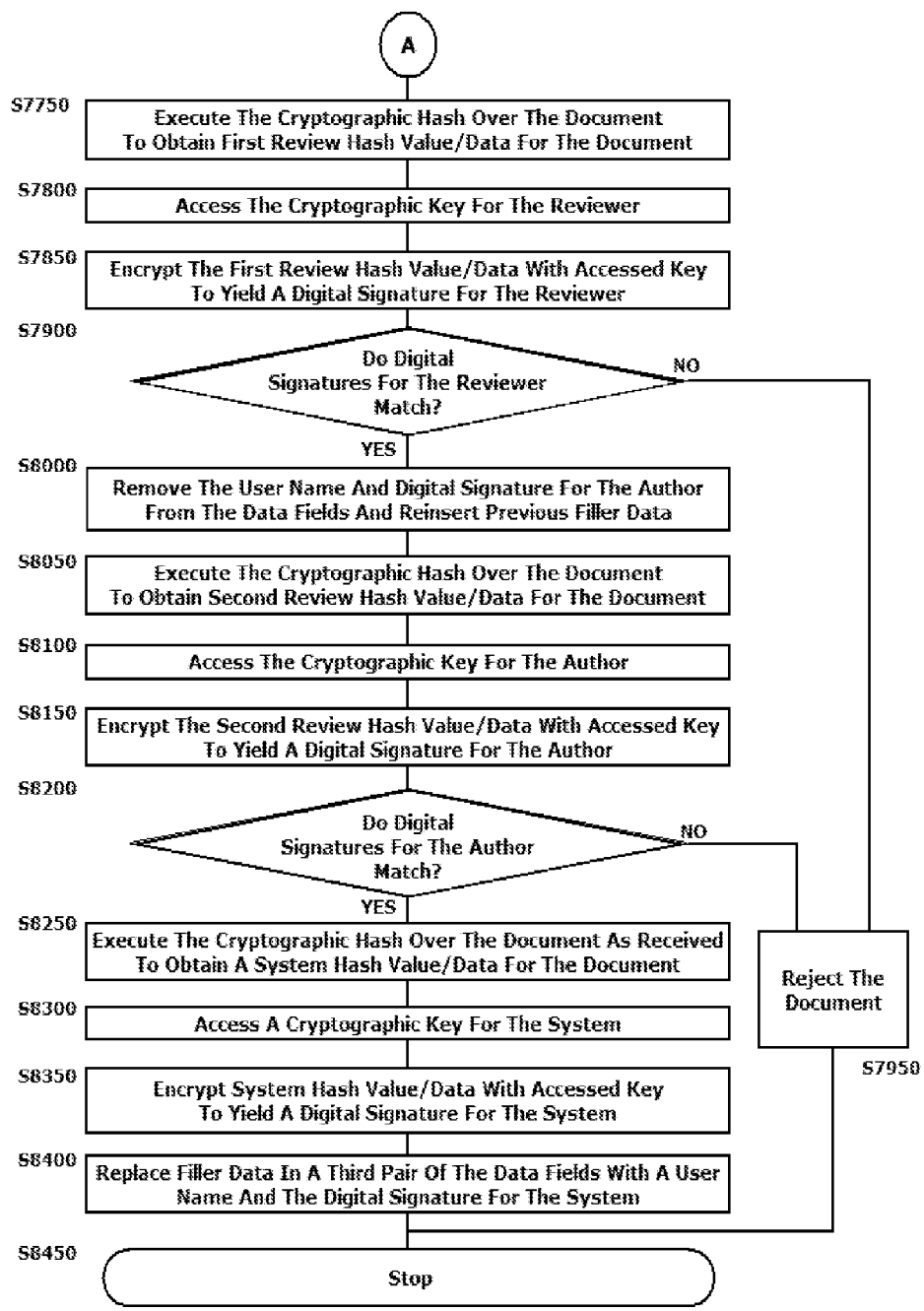

The disclosed embodiments may include a method for implementing a digital signature scheme for embedding and validating multiple nested digital signatures in a digital document. FIGS. 7A and 7B illustrate a flowchart for such an exemplary method. As shown in FIG. 7A, operation of the method commences at Step S7000 and proceeds to Step S7050.

In Step S7050, the method may receive an indication that a digital document has been produced that is intended to be digitally signed. The digital document may be in a complex file format. The indication may be produced manually by an author of the digital document, or may otherwise be provided by a system or application by which the digital document was produced. Operation method proceeds to Step S7100.

In Step S7100, the method may embed a specified number of individual data fields at the end of, or otherwise in some specified position within, the digital document. The number of data fields must be determined manually or automatically at this point in the method prior to any cryptographic manipulation, or affixing of digital signatures, to the digital document. Once the specified number of data fields is added to the digital document and further processing commences, no additional data fields may be added. The digital document will define a specific file size that will not be modified throughout further manipulation and affixing of digital signatures to the digital document. Each of the added data fields will be populated with generic "filler" data as placeholders of a specific data size that will later be replaced with user names and associated digital signatures in the digital document. Operation of the method proceeds to Step S7150.

In Step S7150, the method may execute a cryptographic scheme, such as an encrypting hash, over the entire digital document including the added data fields. A result of the executed cryptographic scheme may be a hash value or hash data for the document. Those of skill in the art will understand the use of the terms hash value and hash data as may result from the application of the cryptographic scheme to the digital document. Operation of the method proceeds to Step S7200.

In Step S7200, the method may access the cryptographic key for the document author. It should be recognized that the document author may not have access to the cryptographic key, nor is the document author necessarily concerned with use of the cryptographic key. Cryptographic keys associated with specific users, including the document author, may be stored in an accessible database. Operation of the method proceeds to Step S7250.

In Step S7250, the method may encrypt the hash value/data with the accessed cryptographic key for the document author. In this manner, an encrypted seal or digital signature for the document author is produced. Operation of the method proceeds to Step S7300.

In Step S7300, the method may replace the filler data in at least a first pair of the added data fields individually and respectively with a user name associated with the document author being placed in a first field of the first pair of added data fields and the produced encrypted seal or digital signature for the document author being placed in a second field of the first pair of added data fields. Operation of the method proceeds to Step S7350.

In Step S7350, the method may receive an indication that a reviewer accepts the digital document. Once the digital signature of the document author is included in the digital document according to Step S7300, the digital document may be stored for access by one or more reviewers/users. Once a reviewer has reviewed the digital document and intends to approve the document, or if there is an instance where a user's access to the document must be verified, the method may receive a manual or automated input that the digital document has been accessed and/or reviewed. If the review process requires a reviewer to approve/accept the digital document, the method may include some indication by which the reviewer indicates such approval/acceptance of the digital document. Additionally, each reviewer may validate all previous signatures as part of his or her review according to the steps outlined below. Here, for example, the first reviewer may validate the author's signature before applying his or her own signature, and subsequent reviewers may validate all previous reviewers' signatures as well as the author's signature before applying their own signatures. Operation of the method proceeds to Step S7400.

In Step S7400, the method may execute the same cryptographic hash over the entire reviewed digital document to obtain another hash value or hash data for the digital document. This hash value or hash data will be different from that previously obtained for the digital document based on the generic filler data in the first pair of data fields having been replaced with the user name and the digital signature for the digital document author. Operation of the method proceeds to Step S7450.

In Step S7450, the method may access the cryptographic key for the document reviewer. It should be recognized that, just like the document author, the document reviewer may not have access to the cryptographic key, nor is the document reviewer necessarily concerned with use of the cryptographic key. The cryptographic key for the document reviewer may be obtained from the same accessible database as was the cryptographic key for the document author. Operation of the method proceeds to Step S7500.

In Step S7500, the method may encrypt the another hash value/data with the accessed cryptographic key for the document reviewer. In this manner, an encrypted seal or digital signature for the document reviewer is produced. Operation of the method proceeds to Step S7550.

In Step S7550, the method may replace the filler data in at least a second pair of the added data fields individually and respectively with a user name associated with the document reviewer being placed in a first field of the second pair of added data fields and the produced encrypted seal or digital signature for the document reviewer being placed in a second field of the second pair of added data fields. Operation of the method proceeds to Step S7600.

Step S7600 is a determination step. In Step S7600, a determination is made regarding whether additional reviewers may need review the digital document. This determination may be made based on a manual input up front by the document author regarding a number of intended/required reviewers, or in process by any individual document reviewer, or may otherwise be prescribed by some predetermined and programmed review scheme for produced digital documents to which multiple digital signatures will be added.

If, in Step S7600, it is determined that there are additional reviewers that need review the digital document, operation of the method reverts to Step S7350 in order that encrypted seals or digital signatures for each of the subsequent reviewers may be obtained and added to the digital document by replacing filler data in subsequent pairs of the data fields with that information.

If, in Step S7600, it is determined that there are no additional reviewers that need to review the digital document, operation of the method proceeds to Step S7650.

In Step S7650, the method may receive an indication that the review process is complete and that system validation and/or systems sealing of the digital document should be undertaken. Such indication may be based on a manual input by a final reviewer, an indication that all of the predetermined number of specified added data fields are now filled with digital signature information rather than generic filler data, or according to some other automated input in the digital signature scheme. Operation of the method proceeds to Step S7700.

In Step S7700, in order to commence the validation process, the method may remove the user name and the digital signature for the last reviewer from the data fields populated with that information and reinsert the previously-included filler data. This step is undertaken in order that the digital document appears as it did when it was received by the final reviewer, including all of the previous digital signatures, and prior to the final reviewer causing the method to include his or her user name and encrypted seal or digital signature in a near last pair of populated data fields. Operation of the method proceeds to Step S7750 (see FIG. 7B).

In Step S7750, the method may execute the cryptographic scheme over the document as now temporarily modified to obtain a first review hash value/data for the digital document. Operation of the method proceeds to Step S7800.

In Step S7800, the method may access the cryptographic key for the reviewer whose digital signature was removed from the digital document and placed in the temporary form on which the method currently operates. Operation of the method proceeds to Step S7850.

In Step S7850, the method may encrypt the first review hash value/data with the accessed cryptographic key for the reviewer to yield the encrypted seal or digital signature for the reviewer. Operation the method proceeds to Step S7900.

Step S7900 is a determination step. In Step S7900, a determination is made regarding whether the encrypted seal or digital signature for the reviewer based on the first review hash value/data is the same as the encrypted seal or digital signature that was caused to be generated by the reviewer during the digital signature process.

If, in Step S7900, it is determined that the encrypted seals or digital signatures for a particular reviewer do not match, operation of the method proceeds to Step S7950.

In Step S7950, the digital document may be rejected. Rejection of the digital document may carry with it certain additional tasks that may be executed. First, no further processing may be undertaken with regard to the digital document. The failure of the encrypted seals or digital signatures to match is an indication that the document is no longer reliable, has been altered, or may otherwise have been compromised. In Step S7950, the method may further provide an immediate input to a user of the system that is undertaking the digital signature scheme regarding the non-reliability of the digital document. Further, the digital document may be appropriately marked automatically by the method to indicate its non-reliability. Operation of the method proceeds to Step S8450, where operation of the method ceases.

The validation and comparison process of Steps S7700-S7900 may be repeated for each of the previous reviewers in a backwardly iterative process in order that encrypted seals or digital signatures for each of the previous reviewers may be validated.

If, in Step S7900, and after the validation comparison process of the previous steps is repeated for each of the previous reviewers, it is determined that the encrypted seals or digital signatures for each of the reviewers matches, operation of the method proceeds to Step S8000.

In Step S8000, in order to complete the validation process, the method may remove the user name and the digital signature for the document author from the data fields populated with that information, and reinsert the previously-included filler data. This step is undertaken in order that the digital document appears as it did when it was produced by the document author, and prior to the document author causing the method to include his or her user name and encrypted seal or digital signature in the first pair of populated data fields. Operation of the method proceeds to Step S8050.

In Step S8050, the method may execute the cryptographic scheme over the document as now temporarily modified to obtain a second review hash value/data for the digital document. Operation of the method proceeds to Step S8100.

In Step S8100, the method may access the cryptographic key for the document author whose digital signature was removed from the digital document to place it in the temporary form on which the method currently operates. Operation of the method proceeds to Step S8150.

In Step S8150, the method may encrypt the second review hash value/data with the accessed cryptographic key for the document author to yield the encrypted seal or digital signature for the document author. Operation of the method proceeds to Step S8200.

Step S8200 is a determination step. In Step S8200, a determination is made regarding whether the encrypted seal or digital signature for the document author based on the second review hash value/data is the same as the encrypted seal or digital signature that was caused to be generated by the document author during the digital signature process.

If, in Step S8200, it is determined that the encrypted seals or digital signatures for the document author do not match, operation of the method proceeds to Step S7950 and Step S7950 undertakes the processing discussed above proceeding ultimately to Step S8450 where operation of the method ceases.

If, in Step S8200, it is determined that the encrypted seals or digital signatures for document author match, operation of the method proceeds to Step S8250.

In Step S8250, the method may execute the same cryptographic hash over the entire digital document in the form that the digital document was received from the final reviewer. In this regard, the method may obtain a final hash value or hash data for the system that executes the digital signature scheme. Operation of the method proceeds to Step S8300.

In Step S8300, the method may access the cryptographic key for the system. Operation of the method proceeds to Step S8350.

In Step S8350, the method may encrypt the final hash value/data with the accessed cryptographic key for the system. In this manner, an encrypted seal or digital signature for the system, based on the digital document in its final form, is produced. Operation of the method proceeds to Step S8400.

In Step S8400, the method may replace the filler data in a last pair of the added data fields individually and respectively with a user name associated with the system being placed in a first field of the last pair of added data fields and the produced encrypted seal or digital signature for the system being placed in a second field of the last pair of added data fields. Separately, the system may remove the author's and reviewer (s)' digital signatures, leaving only its own signature in, for example, the first pair of added data fields. Operation of the method proceeds to Step S8450, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable processing environments in and means in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described. These may include individual program modules executed by a processor. Generally, program modules include routine programs, objects, components, data structures, and the like that perform particular tasks or implement particular data types in support of the overall objective of data collection, analysis and assessment.

Those skilled in the art will appreciate that other embodiments of the disclosed subject matter may be practiced with many types of computer system configurations, including personal computers, hand-held devices, multi-processor systems, microprocessor-based or programmable electronics, and the like. Embodiments according to this disclosure may also be practiced in distributed computing environments where tasks are performed by local and remote processing devices that are linked to each other by hardwired links, wireless links, or a combination of both through a communication network. In a distributed computing environment, program modules may be located in both local and remote memory storage devices.

As indicated above, embodiments within the scope of this disclosure may also include computer-readable media having stored computer-executable instructions or data structures that can be accessed, read and executed by a computing device. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access by the processor to be executed by the processor when the processor is caused to communicate in a network environment.

The exemplary depicted sequence of executable instructions or associated data structures represents one example of a corresponding sequence of acts for implementing the functions described in the steps. The exemplary depicted steps may be executed in any reasonable order to affect the objectives of the disclosed embodiments. No particular order to the indicated steps is intended to be implied other than where any particular step is a necessary precondition to execution of any other step.

Although the above description may contain specific details, they should not be construed as limiting the claims in any way. Other configurations of the described embodiments of the disclosed systems and methods are part of the scope of this disclosure. For example, the principles of the disclosure may be applied to multiple users creating and reviewing multiple digital documents separately throughout a distributed work environment where each individual user such as, for example, a digital document author or digital document reviewer may individually benefit from a digital signature scheme as described above. This enables each user to employ the benefits of the disclosure even if any one of the large number of possible applications do not need a specific aspect of the functionality described and depicted in this disclosure to be applied to that specific user. In other words, there may be multiple instances of the components each processing the content in various possible ways. It does not necessarily need to be one system used by all end users. Accordingly, the appended claims and their legal equivalents should only define the disclosure, rather than any specific examples given.

I claim:

1. A method for implementing a digital signature scheme, comprising:

obtaining a digital document;

embedding, using a processor, a pre-determined number of pairs of data fields in the digital document and filling the pre-determined number of pairs of data fields with filler data according to a pre-determined scheme that is known to signatories of the digital document to arrive at a final digital document having a specified resultant final document size;

applying an encrypting hash scheme to the final digital document to obtain a first hash value;

encrypting the first hash value using a first encryption key to obtain a first digital signature;

substituting a first identifier associated with the first encryption key for the filler data in a first data field of a first pair of the pre-determined number of pairs of data fields in the final digital document; and separately substituting the first digital signature for the filler data in a second data field of the first pair of the pre-determined number of pairs of data fields in the final digital document to obtain a first signed final digital document, the first signed final digital document maintaining a same specified resultant final document size based on the substitutions of the first identifier and the first digital signature separately in the first and second data fields of the first pair of the pre-determined number of pairs of data fields.

2. The method of claim 1, the first identifier, the first encryption key and the first digital signature being associated with a document author.

3. The method of claim 1, further comprising:
applying the encrypting hash scheme to the first signed final digital document to obtain a second hash value;
encrypting the second hash value using a second encryption key to obtain a second digital signature;
substituting a second identifier associated with the second encryption key for the filler data in a first data field of a second pair of the the pre-determined number of pairs of data fields in the first signed final digital document; and
separately substituting the second digital signature for the filler data in a second data field of the second pair of the pre-determined number of pairs of data fields in the first signed final digital document to obtain a second signed final digital document,
the second signed final digital document maintaining the same specified resultant final document size based on the substitutions of the second identifier and the second digital signature separately in the first and second data fields of the second pair of the pre-determined number of pairs of data fields.

4. The method of claim 3, the second identifier, the second encryption key and the second digital signature being associated with a document reviewer.

5. The method of claim 4, further comprising:
applying the encrypting hash scheme to a current version of a signed final digital document to obtain a next in numerical order hash value;
encrypting the next in numerical order hash value using a next in numerical order encryption key to obtain a next in numerical order digital signature; and
substituting an identifier associated with the next in numerical order encryption key for the filler data in a first data field of a next in numerical order pair of the pre-determined number of pairs of data fields in the current version of the signed final digital document; and
separately substituting the next in numerical order digital signature for the filler data in a second data field of the next in numerical order pair of the pre-determined number of pairs of data fields for at least one additional document reviewer to generate a next in numerical order signed final digital document,
the next in numerical order signed final digital document maintaining the same specified resultant final document size as previous versions.

6. The method of claim 4, further comprising:
validating the second signed final digital document with the second digital signature, the validating comprising:
temporarily replacing the second identifier associated with the second encryption key with the filler data previously populating the first data field of the second pair of the pre-determined number of pairs of data fields in the second signed final digital document based on the knowledge by the signatories of the pre-determined scheme;
temporarily replacing the second digital signature with the filler data previously populating the second data field of the second pair of the pre-determined number of pairs of data fields in the second signed final digital document based on the knowledge by the signatories of the pre-determined scheme to obtain a first review final digital document;
applying the encrypting hash scheme to the first review final digital document to obtain a first review hash value;
encrypting the first review hash value using the second encryption key to obtain a first review digital signature;
comparing the first review digital signature to the second digital signature; and
rejecting the second signed final digital document when the first review digital signature and the second digital signature do not match.

7. The method of claim 6, the validating further comprising:
temporarily replacing the first identifier associated with the first encryption key with the filler data previously populating the first data field of the first pair of the pre-determined number of pairs of data fields in the first review final digital document based on the knowledge by the signatories of the pre-determined scheme;
temporarily replacing the first digital signature with the filler data previously populating the second data field of the first pair of the pre-determined number of pairs of data fields in the first review final digital document based on the knowledge by the signatories of the pre-determined scheme to obtain a second review final digital document;
applying the encrypting hash scheme to the second review final digital document to obtain a second review hash value;
encrypting the second review hash value using the first encryption key to obtain a second review digital signature;
comparing the second review digital signature to the first digital signature; and
rejecting the second signed final digital document when the second review digital signature and the first digital signature do not match.

8. The method of claim 7, further comprising:
sealing the second signed final digital document with the second digital signature when the second signed final digital document is not rejected, the sealing comprising:
reverting to the second signed digital document with the first identifier associated with the first encryption key, the first digital signature, the second identifier associated with the second encryption key and the second digital signature respectively populating the first data field and the second data field in the first pair and the second pair of the pre-determined number of pairs of data fields;
applying the encrypting hash scheme to the second signed final digital document to obtain a sealing hash value;
encrypting the sealing hash value using a separate encryption key that is associated with at least one of a system or an application that performs the digital signature scheme to obtain a sealing digital signature;
substituting a separate identifier associated with the separate encryption key for the filler data in a first data field of a next pair of the pre-determined number of pairs of data fields in the second signed final digital document; and
separately substituting the sealing digital signature for the filler data in a second data field of the next pair of the pre-determined number of data fields in the second signed final digital document to obtain a sealed digital document.

9. The method of claim 1, the digital document including a complex file format, the complex file format being a National Imagery Transmission Format (NITF).

10. A system for implementing a digital signature scheme, comprising:
   an external communication interface via which a digital document is obtained from a system that generates the digital document;
   a data field adding and filling device that embeds a pre-determined number of pairs of data fields in the digital document and fills the pre-determined number of pairs of data fields with filler data according to a pre-determined scheme that is known to the signatories of the digital document to arrive at a final digital document having a specified resultant final document size; and
   a cryptographic scheme implementing device that applies an encrypting hash scheme to the final digital document to obtain a hash value and that encrypts the hash value using an encryption key to obtain a digital signature,
   the data field adding and filling device (1) substituting an identifier associated with the encryption key for the filler data in a first data field of a first pair of the pre-determined number of pairs of data fields in the final digital document, and (2) separately substituting the digital signature for the filler data in a second data field of the first pair of the pre-determined number of pairs of data fields in the final digital document to obtain a signed final digital document, the signed final digital document maintaining the same specified final document size based on the substitutions of the identifier and the digital signature separately in the first and second data fields of the first pair of the pre-determined number of pairs of data fields.

11. The system of claim 10, the identifier, the encryption key and the digital signature being associated with a document author.

12. The system of claim 10, the cryptographic scheme implementing device applying the encrypting hash scheme to the signed final digital document to obtain another hash value and encrypting the another hash value using another encryption key to obtain another digital signature, and the data field adding and filling device (1) substituting another identifier associated with the another encryption key for the filler data in a first data field of a subsequent pair of the multiple pairs of data fields in the signed final digital document, and (2) separately substituting the another digital signature for the filler data in a second data field of the subsequent pair of the pre-determined number of pairs of data fields in the signed final digital document to obtain a multiply signed final digital document, the multiply signed final digital document maintaining the same specified final document size based on the substitutions of the another identifier and the another digital signature separately in the first and second data fields of the subsequent pair of the pre-determined number of pairs of data fields.

13. The system of claim 12, the another identifier, the another encryption key and the another digital signature being associated with a document reviewer.

14. The system of claim 10, further comprising:
   a hash value/data comparing device that (1) temporarily replaces the identifier associated with the encryption key with the filler data that previously populated the first data field of the first pair of the pre-determined number of pairs of data fields of the signed final digital document based on the knowledge by the signatories of the pre-determined scheme, and (2) temporarily replaces the digital signature with the filler data that previously populated the second data field of the first pair of the pre-determined number of pairs of data fields of the signed final digital document based on the knowledge by the signatories of the pre-determined scheme to obtain a temporarily modified digital document; and
   a document rejecting device,
   the cryptographic scheme implementing device applying the encrypting hash scheme to the temporarily modified digital document to obtain a comparing hash value and encrypting the hash value using the encryption key to obtain a comparing digital signature,
   the hash value/data comparing device comparing the comparing digital signature to the digital signature to determine whether the digital signatures match, and
   the document rejecting device directing that no further processing occur with regard to the digital document when the hash value/data comparing device determines that the signatures do not match.

15. A non-transitory computer-readable medium storing instructions which, when executed by a processor, cause the processor to execute a method for implementing a digital signature scheme, comprising:
   obtaining a digital document;
   embedding pre-determined number of pairs of data fields in the digital document and filling the pre-determined number of pairs of data fields with filler data according to a pre-determined scheme that is known to signatories of the digital document to arrive at a final digital document having a specified resultant final document size;
   applying an encrypting hash scheme to the final digital document to obtain a first hash value;
   encrypting the first hash value using a first encryption key to obtain a first digital signature;
   substituting a first identifier associated with the first encryption key for the filler data in a first data field of a first pair of the pre-determined number of pairs of data fields in the final digital document; and
   separately substituting the first digital signature for the filler data in a second data field of the first pair of the pre-determined number of pairs of data fields in the final digital document to obtain a first signed final digital document,
   the first signed final digital document maintaining a same specified resultant final document size based on the substitutions of the first identifier and the first digital signature separately in the first and second data fields of the first pair of the pre-determined number of pairs of data fields.

16. The non-transitory computer-readable medium of claim 15, the method further comprising:
   applying the encrypting hash scheme to the first signed final digital document to obtain a second hash value;
   encrypting the second hash value using a second encryption key to obtain a second digital signature; and
   substituting a second identifier associated with the second encryption key for the filler data in a first data field of a second pair of the pre-determined number of pairs of data fields in the first signed final digital document; and
   separately substituting the second digital signature for the filler data in a second data field of the second pair of the pre-determined number of pairs of data fields in the first signed final digital document to obtain a second signed final digital document, the second signed final digital document maintaining the same specified resultant final document size based on the substitutions of the second identifier and the second digital signature separately in the first and second data fields of the second pair of the pre-determined number of pairs of data fields.

17. The non-transitory computer-readable medium of claim 16, the method further comprising:
applying the encrypting hash scheme to a current version of a signed final digital document to obtain a next in numerical order hash value,
encrypting the next in numerical order hash value using a next in numerical order encryption key to obtain a next in numerical order digital signature, and
substituting an identifier associated with the next in numerical order encryption key for the filler data in a first data field of a next in numerical order pair of the pre-determined number of pairs of data fields in the current version of the signed final digital document; and
separately substituting the next in numerical order digital signature for the filler data in a second data field of the next in numerical order pair of the pre-determined number of pairs of data fields for at least one additional document reviewer to generate a next in numerical order signed final digital document,
the next in numerical order signed final digital document maintaining the same specified resultant final document size as previous versions.

18. The non-transitory computer-readable medium of claim 17, the method further comprising:
validating the second signed final digital document with the second digital signature, the validating comprising:
temporarily replacing the second identifier associated with the second encryption key with the filler data previously populating the first data field of the second pair of the pre-determined number of pairs of data fields in the second signed final digital document based on the knowledge by the signatories of the pre-determined scheme;
temporarily replacing the second digital signature with the filler data previously populating the second data field of the second pair of the pre-determined number of pairs of data fields in the second signed final digital document based on the knowledge by the signatories of the pre-determined scheme to obtain a first review final digital document;
applying the encrypting hash scheme to the first review final digital document to obtain a first review hash value;
encrypting the first review hash value using the second encryption key to obtain a first review digital signature;
comparing the first review digital signature to the second digital signature; and
rejecting the second signed final digital document when the first review digital signature and the second digital signature do not match.

19. The non-transitory computer-readable medium of claim 18, the validating further comprising:
temporarily replacing the first identifier associated with the first encryption key with the filler data previously populating the first data field of the first pair of the pre-determined number of pairs of data fields in the first review final digital document based on the knowledge by the signatories of the pre-determined scheme;
temporarily replacing the first digital signature with the filler data previously populating the second data field of the first pair of the pre-determined number of pairs of data fields in the first review final digital document based on the knowledge by the signatories of the pre-determined scheme to obtain a second review final digital document;
applying the encrypting hash scheme to the second review final digital document to obtain a second review hash value;
encrypting the second review hash value using the first encryption key to obtain a second review digital signature;
comparing the second review digital signature to the first digital signature; and
rejecting the second signed final digital document when the second review digital signature and the first digital signature do not match.

20. The non-transitory computer-readable medium of claim 19, the method further comprising:
sealing the second signed final digital document with the second digital signature when the second signed final digital document is not rejected, the sealing comprising:
reverting to the second signed digital document with the first identifier associated with the first encryption key, the first digital signature, the second identifier associated with the second encryption key and the second digital signature respectively populating the first data field and the second data field in the first pair and the second pair of the pre-determined number of pairs of data fields;
applying the encrypting hash scheme to the second signed final digital document to obtain a sealing hash value;
encrypting the sealing hash value using a separate encryption key that is associated with at least one of a system or an application that performs the digital signature scheme to obtain a sealing digital signature;
substituting a separate identifier associated with the separate encryption key for the filler data in a first data field of a next pair of the pre-determined number of pairs of data fields in the second signed final digital document; and
separately substituting the sealing digital signature for the filler data in a second data field of the next pair of the pre-determined number of data fields in the second signed final digital document to obtain a sealed digital document.

21. The non-transitory computer-readable medium of claim 15, the digital document including a complex file format, the complex file format being a National Imagery Transmission Format (NITF).

\* \* \* \* \*